United States Patent
Kang et al.

(10) Patent No.: US 12,485,848 B2
(45) Date of Patent: Dec. 2, 2025

(54) SEAT BELT RETRACTOR MOUNTING STRUCTURE AND A VEHICLE BODY INCLUDING THE SAME

(71) Applicants: HYUNDAI MOTOR COMPANY, Seoul (KR); KIA CORPORATION, Seoul (KR)

(72) Inventors: ChangHak Kang, Hwaseong-si (KR); Yong Won Choi, Hwaseong-si (KR); Joon Tak Park, Hwaseong-si (KR); Il Chang Sung, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/961,070

(22) Filed: Nov. 26, 2024

(65) Prior Publication Data
US 2025/0206255 A1 Jun. 26, 2025

(30) Foreign Application Priority Data
Dec. 20, 2023 (KR) .................. 10-2023-0187186

(51) Int. Cl.
*B60R 22/34* (2006.01)

(52) U.S. Cl.
CPC ...... *B60R 22/34* (2013.01); *B60R 2022/3402* (2013.01)

(58) Field of Classification Search
CPC .................. B60R 22/34; B60R 2022/3402
See application file for complete search history.

(56) References Cited

U.S. PATENT DOCUMENTS

| | | | |
|---|---|---|---|
| 2003/0094831 A1* | 5/2003 | Kondo | B60K 37/00 296/70 |
| 2014/0042791 A1* | 2/2014 | Gardner | B60N 2/90 297/452.14 |
| 2020/0079254 A1* | 3/2020 | Mori | B60R 22/34 |
| 2022/0194478 A1* | 6/2022 | Song | B62D 25/081 |
| 2022/0212538 A1* | 7/2022 | Kim | B60K 35/60 |
| 2022/0281530 A1* | 9/2022 | Lee | B60R 22/34 |
| 2023/0202576 A1* | 6/2023 | Kang | B62D 25/2036 296/193.02 |

FOREIGN PATENT DOCUMENTS

| | | | | |
|---|---|---|---|---|
| DE | 19925484 A1 | * | 2/2000 | ......... B60R 5/044 |
| DE | 102021105010 A1 | * | 9/2022 | ......... B60N 2/688 |
| JP | 2019064497 A | * | 4/2019 | |
| KR | 19990018825 U | * | 6/1999 | |

OTHER PUBLICATIONS

Son, Title Not Available, Jun. 5, 1999, K-PION, KR 19990018825 U, Machine Translation of Description (Year: 1999).*
Son, Rear Trim Part For A Sedan, Feb. 3, 2000, EPO, DE 19925484 A1, Machine Translation of Description (Year: 2000).*

* cited by examiner

*Primary Examiner* — Paul N Dickson
*Assistant Examiner* — Matthew D Lee
(74) *Attorney, Agent, or Firm* — Lempia Summerfield Katz LLC (57) ABSTRACT

A seat belt retractor mounting structure for a vehicle includes a cowl cross unit arranged in the width direction of a vehicle body and includes a seat belt retractor mounted on the cowl cross unit.

7 Claims, 6 Drawing Sheets

SEAT BELT RETRACTOR MOUNTING STRUCTURE AND A VEHICLE BODY INCLUDING THE SAME

CROSS-REFERENCE TO RELATED APPLICATION

This application claims priority to and the benefit of Korean Patent Application No. 10-2023-0187186 filed in the Korean Intellectual Property Office on Dec. 20, 2023, the entire contents of which are incorporated herein by reference.

BACKGROUND OF THE DISCLOSURE

(a) Technical Field

The present disclosure relates to a seat belt retractor mounting structure and to a vehicle body including the same.

(b) Description of the Related Art

Recently, the vehicle industry is introducing a new concept of a future mobility vision for realizing a human-centered, dynamic future city. One of these future mobility solutions is the Purpose Built Vehicle (PBV) as a purpose-based mobility, i.e., mobile device or vehicle.

The PBV is an environment-friendly electric vehicle (EV) that provides various customized services to users and can be used as an autonomous vehicle.

For example, in the case of a self-driving vehicle, the first row for occupants may be configured with rear-facing seats to increase space utilization of the vehicle.

If the first row seats are rear-facing BIS (Belt-in-Seat) type, all the load is applied to the seat, so reinforcement of the seat is required for additional support of the seat belt retractor.

Seat belt retractors in autonomous vehicles that are currently scheduled to be released or that are already available to the public are sometimes mounted on the dash panel of the vehicle body. However, if the retractor is mounted on the dash panel as in general electric vehicles (EVs) and internal combustion engine (ICE) vehicles, there is a possibility of interference with the heating, ventilation, and air conditioning (HVAC) system and duct path.

In other words, it is feasible to mount the seat belt retractor on the dash panel, etc., only in cases where there is no crash pad or air conditioner.

The information contained in this background section has been prepared to promote understanding of the background of the disclosure and may include subject matter that is not prior art and that may or may not already be known to those having ordinary skill in the art.

SUMMARY OF THE DISCLOSURE

The present disclosure provides a seat belt retractor mounting structure capable of stably mounting a seat belt retractor without additional reinforcement for supporting the seat belt retractor and also provides a vehicle body including the same.

A seat belt retractor mounting structure according to an embodiment may include a cowl cross unit arranged in the width direction of a vehicle body and may include a seat belt retractor mounted on the cowl cross unit.

The cowl cross unit may include a cowl cross bar and a cowl cross bar mounting bracket that mounts the cowl cross bar inside the vehicle body.

The seat belt retractor may be mounted on the cowl cross bar mounting bracket.

The cowl cross unit may be mounted in a position further forward in the vehicle body than a door opening flange.

The seat belt retractor may be mounted at or toward a forward portion on the cowl cross bar mounting bracket. The cowl cross bar may be mounted toward or at a rear portion on the cowl cross bar mounting bracket.

The cowl cross bar mounting bracket may include a side flange connected to an inner surface of an inner panel and may include an upper flange connected to an upper surface of the inner panel.

A vehicle body according to an embodiment may include the seat belt retractor mounting structure provided in the front direction of a first row of a rear-facing seat.

The vehicle body according to an embodiment may further include a dash panel with internal components including an air conditioner mounted on the front of the seat belt retractor mounting structure.

According to the seat belt retractor mounting structure and the vehicle body including the same according to an embodiment of the present disclosure, the seat belt retractor may be stably mounted without additional reinforcement.

In addition, the effects that can be obtained or expected from embodiments of the present disclosure are directly or implicitly disclosed in the detailed description of the embodiments of the present disclosure. In other words, various effects predicted according to embodiments of the present disclosure will be disclosed in the detailed description to be provided later.

BRIEF DESCRIPTION OF THE DRAWINGS

Since the appended drawings are for reference in explaining embodiments of the present disclosure, the technical ideas of the present disclosure should not be interpreted as limited to the attached drawings.

It should be understood that the drawings referenced above are not necessarily drawn to scale, but rather present a somewhat simplified representations of various features illustrating the basic principles of the present disclosure.

For example, specific design features of the present disclosure, including particular dimensions, orientations, locations, and shapes, will be determined in part by the particular intended application and usage environment.

DETAILED DESCRIPTION OF THE EMBODIMENTS

Hereinafter, with reference to the attached drawings, embodiments of the present disclosure are described in detail so that a person having ordinary skill in the art to which the present disclosure pertains can practice the technical aspects of the present disclosure.

As those of ordinary skill in the art should realize, the described embodiments may be modified in various different ways, all without departing from the spirit or scope of the present disclosure.

The terminology used herein is for the purpose of describing particular embodiments only and is not intended to be limiting of the present disclosure.

As used herein, the singular forms are intended to include the plural forms as well, unless the context clearly indicates otherwise.

In order to clearly explain the present disclosure, parts irrelevant to the description have been omitted, and the same reference numerals are used for identical or similar components throughout the specification.

In addition, in the detailed description below, the names of the components may be divided into first, second, etc. to distinguish them when the components are in a similar relationship, and the description below is not necessarily limited to that order.

It should also be understood that the terms "comprises" and/or "comprising" as used herein indicate the presence of stated features, integers, steps, operations, elements, and/or components, but do not preclude the presence or addition of one or more other features, integers, steps, operations, components, and/or groups thereof. The same should apply to terms such as "include" and "have" and variations thereof.

As used herein, the term 'and/or' includes any and all combinations of one or more of the associated listed items.

In this specification, the term 'connected' indicates a physical relationship between two components, for example, in which components are directly connected to each other by welding, self-piercing rivet (SPR), flow drill screw (FDS), structural adhesive, or the like, or components that are indirectly connected through one or more intermediate components.

As used herein, 'vehicle', 'vehicular', 'automotive' or other similar terms as used herein generally refer to passenger vehicles, sports cars, sport utility vehicles (SUVs), buses, trucks, and various commercial vehicles including passenger automobiles, hybrid vehicles, electric vehicles, hybrid electric vehicles, electric vehicle-based PBVs (Purpose Built Vehicles), hydrogen-powered vehicles and other alternative fuel vehicles (e.g., other than petroleum fuel derived from resources).

In this specification, the reference direction for explaining the components below may be set as the front-rear direction of the vehicle body (e.g., body length direction or longitudinal direction), the width direction (e.g., lateral direction or left-right direction), and the up-down direction (e.g., height direction or vertical direction) based on the vehicle body.

Furthermore, in this specification, an end of a component (e.g., one end or another (other) end, etc.) denotes an end of a component in any one direction An end portion of the component (e.g., one end portion) or other (another) end portion, etc.) denotes a portion of a component that includes that end.

When a component, device, element, or the like of the present disclosure is described as having a purpose or performing an operation, function, or the like, the component, device, element, or the like should be considered herein as being "configured to" meet that purpose or to perform that operation or function.

Embodiments are hereinafter described in detail with reference to the accompanying drawings.

Figure 1:
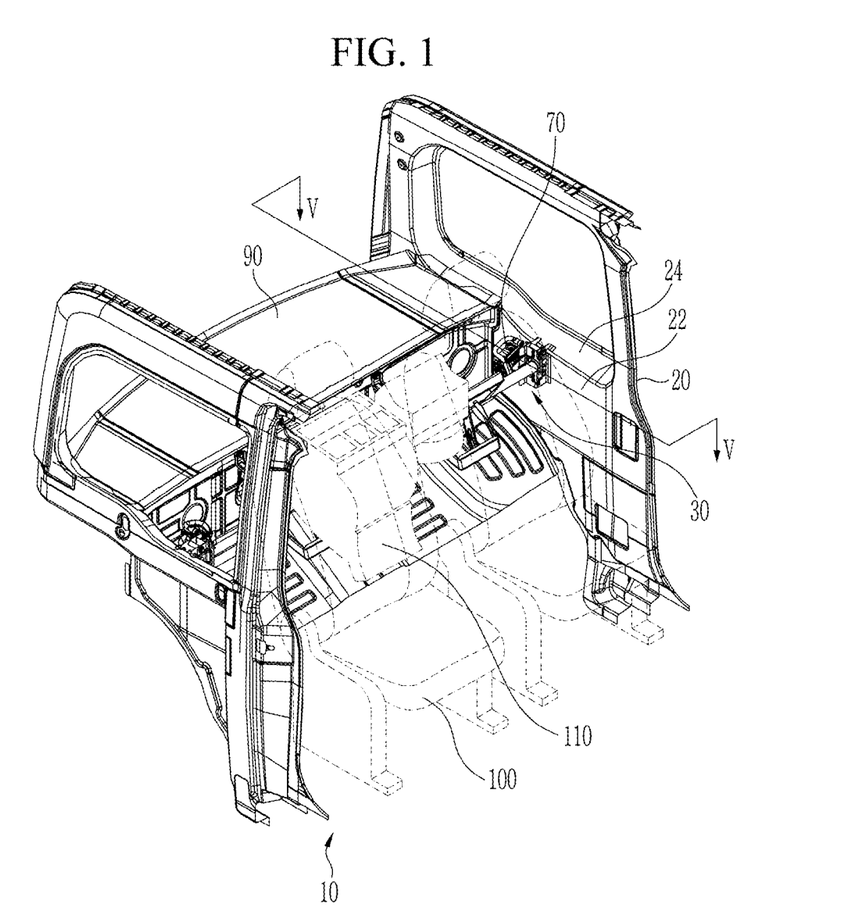
FIG. 1 is a partial perspective view of a vehicle body with a seat belt retractor mounting structure applied according to an embodiment.

FIG. 1 is a partial perspective view of a vehicle body with a seat belt retractor mounting structure applied according to an embodiment.

Referring to FIG. 1, a seat belt retractor mounting structure according to an embodiment may include a cowl cross unit 30 arranged in a width direction of a vehicle body 10 and may include a seat belt retractor 70 mounted on the cowl cross unit 30.

The vehicle body 10, including the seat belt retractor mounting structure according to an embodiment, may have various shapes and purposes of vehicle bodies 10 depending on the type of customized service of the PBV.

For example, the vehicle body 10 according to an embodiment may be a hailing vehicle and may be a vehicle to which a seat, for example, a rear-facing seat 100 is applied in the first row to increase space utilization.

In general, when the first row seats are rear-facing seats, BIS (Belt-in-Seat) is sometimes used.

However, in the case of seats with BIS, all loads are applied to the seat, so reinforcement of the seat is required for additional support of the seat belt retractor.

In addition, there are cases where the seat belt retractor of autonomous vehicles is mounted on the dash panel of the vehicle body. However, if the retractor is mounted on the dash panel, it may interfere with the heating, ventilation, and air conditioning (HVAC) system, components, and ductwork or duct paths. This can make it difficult to mount the seat belt retractor, which may lower productivity.

In other words, the seat belt retractor can be mounted on the dash panel, etc. but only when the crash pad or air conditioner is not mounted on the dash panel or near the dash panel or when internal components are not mounted on the dash panel or near the dash panel.

In the seat belt retractor mounting structure according to an embodiment, the seat belt retractor 70 may be mounted on the cowl cross unit 30 arranged in the width direction of the vehicle body 10.

That is to say, the seat belt retractor 70 may be stably mounted without any additional configuration for mounting the seat belt retractor 70.

Figure 2:
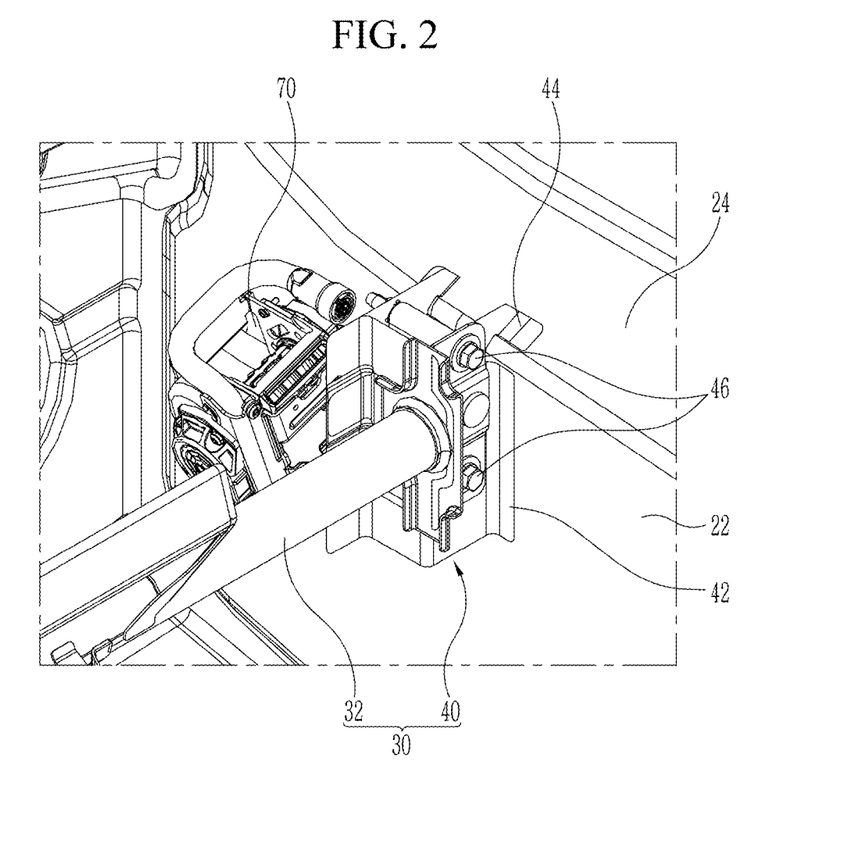
FIG. 2 is a perspective view of a seat belt retractor mounting structure according to an embodiment.
Figure 3:
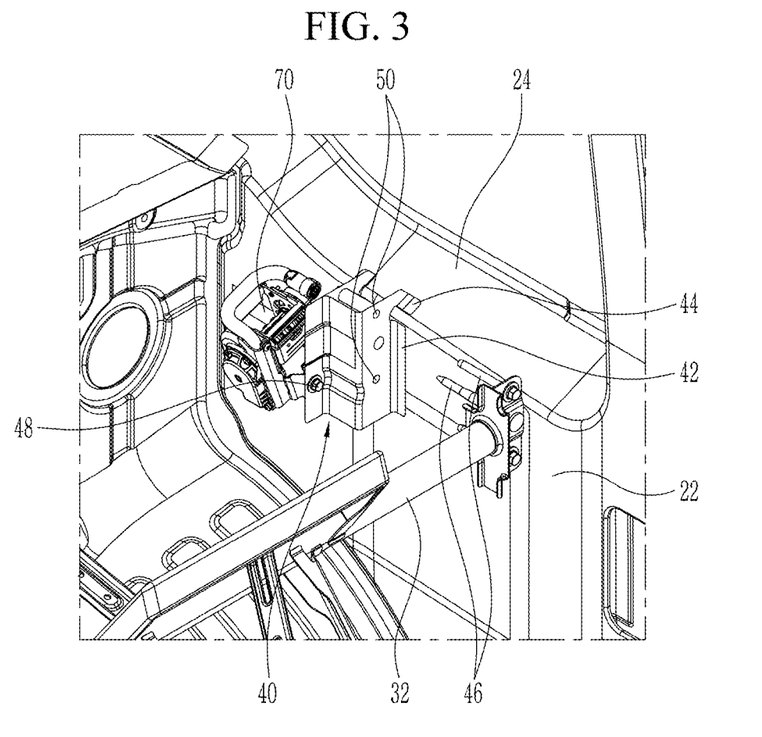
FIG. 3 is a partly exploded perspective view of the seat belt retractor mounting structure of FIG. 2 according to an embodiment.
Figure 4:
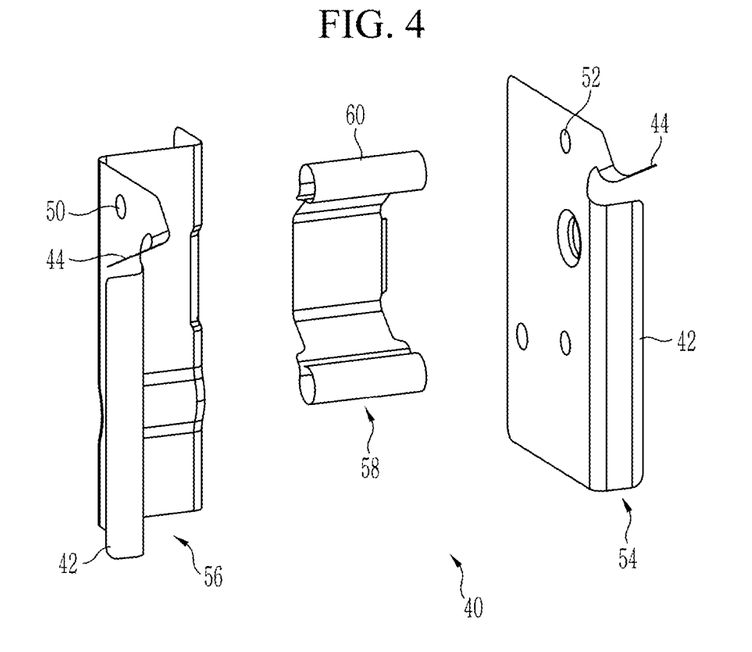
FIG. 4 is an exploded perspective view of a cowl cross bar mounting bracket that is applicable to a seat belt retractor mounting structure according to an embodiment.

FIG. 2 is a perspective view of a seat belt retractor mounting structure according to an embodiment. FIG. 3 is a partly exploded perspective view of the seat belt retractor mounting structure of FIG. 2 according to an embodiment. FIG. 4 is an exploded perspective view of a cowl cross bar mounting bracket applicable to a seat belt retractor mounting structure according to an embodiment.

Referring to FIGS. 1-4, the cowl cross unit 30 may include a cowl cross bar 32 and a cowl cross bar mounting bracket 40 that mounts the cowl cross bar 32 within the vehicle body 10.

The seat belt retractor 70 may be mounted on the cowl cross bar mounting bracket 40.

The cowl cross bar 32 is a skeleton that prevents the vehicle body from bending or twisting in the left-right direction and increases the durability of the vehicle body. and the cowl cross bar 32 is a configuration that protects the safety of occupants in the event of a vehicle collision.

Therefore, the cowl cross bar 32 is rigidly mounted inside the vehicle body and has a relatively high collision strength.

The seat belt retractor 70, which may be applied to the seat belt retractor mounting structure according to an embodiment, is mounted on the cowl cross bar mounting bracket 40, which mounts the cowl cross bar 32 to the vehicle body 10, without the need for a separate mounting bracket, thereby reducing the number of parts.

Additionally, vehicle production costs can be reduced because no separate parts are added, and the weight of the entire vehicle can also be reduced.

The cowl cross bar mounting bracket 40 may include a side flange 42 connected to an inner surface 22 of an inner panel 21 provided on the inner side of the vehicle body 10. The cowl cross bar mounting bracket 40 may also include an upper flange 44 connected to an upper surface 24 of the inner panel 21.

The cowl cross bar mounting bracket 40 is respectively attached to the upper and side parts of the inner panel 21. Thus, the cowl cross bar mounting bracket 40 may be stably attached to the inner panel 21.

The seat belt retractor 70 may be mounted in the front direction of the cowl cross bar mounting bracket 40, i.e., in a position toward or in front of a front portion on the cowl cross bar mounting bracket 40 relative to the front or forward end of the vehicle. The cowl cross bar 32 may be mounted in the rear direction of the cowl cross bar mounting bracket 40, i.e., positioned toward or behind, i.e., at a rear portion on the cowl cross bar mounting bracket 40 relative to the rear or rearward end of the vehicle body 10.

A cowl cross bar connecting hole 50 is formed or provided in the cowl cross bar mounting bracket 40. A cowl cross bar connecting bolt 46 may mount the cowl cross bar 32 to the cowl cross bar mounting bracket 40 through the cowl cross bar connecting hole 50.

Additionally, a seat belt retractor connecting hole 52 is formed or provided in the cowl cross bar mounting bracket 40. A seat belt retractor connecting bolt 48 may mount the seat belt retractor 70 to the cowl cross bar mounting bracket 40 through the seat belt retractor connecting hole 52.

The cowl cross bar mounting bracket 40 may include a mounting bracket front body 54, a mounting bracket rear body 56, and a mounting bracket central body 58 that connects the mounting bracket front body 54 and the mounting bracket rear body 56.

A bolt spacer 60 is formed or provided in the mounting bracket central body 58 so that the cowl cross bar connecting bolt 46 may be inserted.

The cowl cross bar mounting bracket 40 has a simple configuration, which can stably mount the cowl cross bar 32 and the cowl cross bar mounting bracket 40 to the vehicle body 10.

Figure 5:
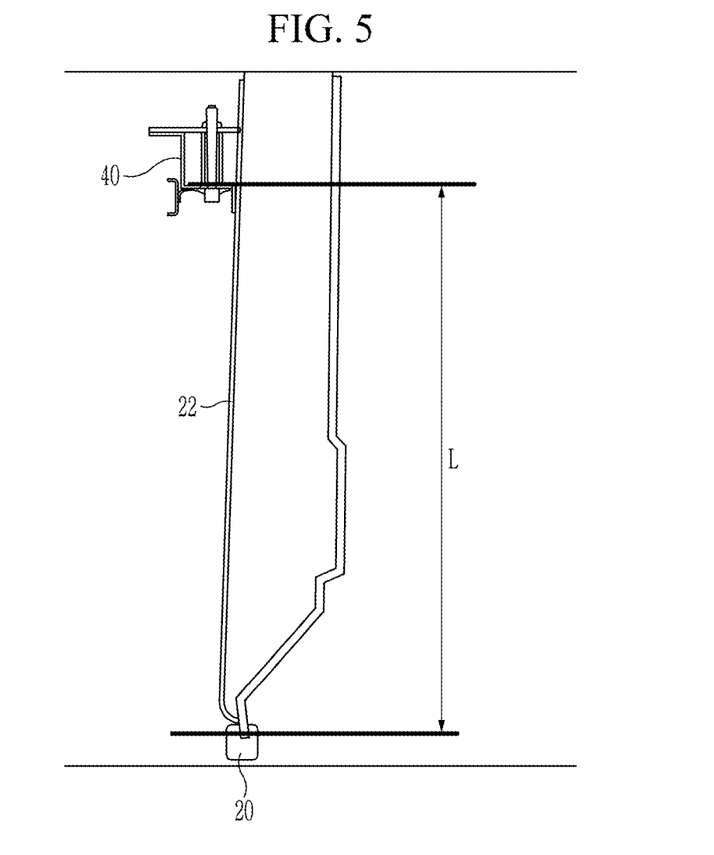
FIG. 5 is a cross-sectional view taken along line V-V of the seat belt retractor mounting structure of FIG. 1.

FIG. 5 is a cross-sectional view along line V-V of FIG. 1.

Referring to FIG. 1 and FIG. 5, the cowl cross unit 30 may be mounted in a position or distance L that is further toward the vehicle body front or forward end than the door opening flange 20.

The seat belt retractor mounting structure according to an embodiment may be provided in the front direction of the rear-facing seat 100, i.e. in front of or forward of the rear-facing seat 100 relative to the front or forward end of the vehicle body 10.

In other words, the vehicle body 10 including the seat belt retractor mounting structure according to an embodiment may be a PBV (Purpose Built Vehicle) and may also be a hailing vehicle for transporting occupants.

Additionally, the vehicle body 10 could be a PBV with the rear-facing seat 100 applied to increase space utilization.

The rear-facing seat 100 is applied to increase space utilization and the cowl cross bar 32 is installed in the front direction of the vehicle body 10, i.e., forward of, the rear-facing seat 100. Thus, in the event of a vehicle collision, the cowl cross bar 32 can protect the occupant(s) sitting in the rear-facing seat(s) 100.

That is to say, the cowl cross unit 30 may be mounted closer to the front of the vehicle than the door opening flange 20 to increase space utilization.

The vehicle body 10 according to an embodiment may further include a dash panel 90 having internal components 110 including an air conditioner mounted in front of the seat belt retractor mounting structure.

Most of the internal components 110 at the front of the vehicle may include (though not shown) a steering wheel, a brake or deceleration pedal, an accelerator pedal, one or more air bags, HVAC components, a glove box, one or more cooling ducts, one or more heating ducts, and other air conditioning control panels that are positioned on the crash pad of the vehicle body 10.

The vehicle body 10, to which the seat belt retractor mounting structure according to an embodiment is applied, has a high design degree of freedom and can increase vehicle production efficiency because the seat belt retractor 70 is not mounted on the dash panel 90 to which the internal components 110 are mounted.

Figure 6:
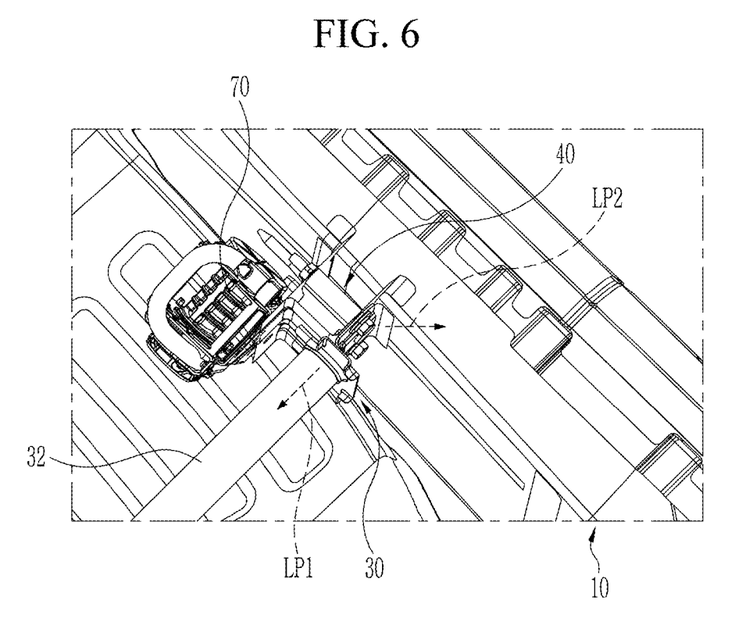
FIG. 6 is a view showing load paths of a the vehicle body including a seat belt retractor mounting structure according to an embodiment.

FIG. 6 is shows load paths of the vehicle body 10 including the seat belt retractor mounting structure according to an embodiment.

Referring to FIG. 6, in the case of a vehicle body 10 including the seat belt retractor mounting structure according to an embodiment, the seat belt retractor 70 is mounted on the cowl cross unit 30. Thus, when the vehicle including the vehicle body 10 collides with an object, the collision load is dispersed into load path LP1 through the cowl cross bar 32 and load path L2 through the vehicle body 10, thereby ensuring the safety of the occupant.

According to the embodiments of the seat belt retractor mounting structure and the vehicle body including the same, the seat belt retractor may be stably mounted without additional reinforcement for supporting the seat belt retractor.

According to the embodiments of the seat belt retractor mounting structure and the vehicle body including the same, the seat belt retractor may reduce vehicle production cost and reduce the weight of the entire vehicle without requiring a separate mounting bracket, etc.

According to the embodiments of the seat belt retractor mounting structure and the vehicle body including the same, the cowl cross bar is installed in the front direction of the vehicle body further forward relative to the rear-facing seat(s). Thus, in the event of a vehicle collision, the cowl cross bar can protect the occupant(s) sitting in the rear-facing seat.

According to the embodiments of the seat belt retractor mounting structure and the vehicle body including the same, the cowl cross unit can be mounted in a position further forward toward the front of the vehicle than the door opening flange, thus increasing space utilization.

While the technical aspects of this disclosure have been described in connection with what are presently considered to be practical embodiments, it is to be understood that the disclosure is not limited to the disclosed embodiments. On the contrary, disclosure is intended to cover various modifications and equivalent arrangements included within the spirit and scope of the appended claims.

| <Description of symbols> | |
| --- | --- |
| 10: vehicle body | 20: door opening flange |
| 21: inner panel | 22: inner panel inner surface |
| 24: inner panel upper surface | 30: cowl cross unit |

Description of symbols

32: cowl cross bar
40: cowl cross bar mounting bracket
42: side flange
44: upper flange
46: cowl cross bar connecting bolt
48: seat belt retractor connecting bolt
50: cowl cross bar connecting hole
52: : seat belt retractor connecting hole
54: mounting bracket front body
56: mounting bracket rear body
58: mounting bracket central body
60: bolt spacer
70: seat belt retractor
90: dash panel
100: rear-facing seat
110: Internal components

What is claimed is:

1. A seat belt retractor mounting structure comprising:
a cowl cross unit arranged in a width direction of a vehicle body; and
a seat belt retractor mounted on the cowl cross unit,
wherein the seat belt retractor mounting structure is provided forward of a first row rear-facing seat on the vehicle body, and
wherein the vehicle body further includes a dash panel with internal components including an air conditioner mounted further forward of the seat belt retractor mounting structure.

2. The seat belt retractor mounting structure of claim 1, wherein the cowl cross unit comprises:
a cowl cross bar; and
a cowl cross bar mounting bracket that mounts the cowl cross bar inside the vehicle body.

3. The seat belt retractor mounting structure of claim 2, wherein the seat belt retractor is mounted on the cowl cross bar mounting bracket.

4. The seat belt retractor mounting structure of claim 3, wherein the cowl cross unit is mounted in a position that is further forward in the vehicle body than a door opening flange.

5. The seat belt retractor mounting structure of claim 3, wherein:
the seat belt retractor is mounted on the cowl cross bar mounting bracket at or toward a forward portion of the cowl cross bar mounting bracket; and
the cowl cross bar is mounted toward or at a rear portion of the cowl cross bar mounting bracket.

6. The seat belt retractor mounting structure of claim 3, wherein the cowl cross bar mounting bracket comprises:
a side flange connected to an inner surface of an inner panel of the vehicle body; and
an upper flange connected to an upper surface of the inner panel.

7. A vehicle body comprising:
a seat belt retractor mounting structure including a cowl cross unit arranged in a width direction of the vehicle body and a seat belt retractor mounted on the cowl cross unit,
wherein the seat belt retractor mounting structure is provided forward of a first row rear-facing seat on the vehicle body.

* * * * *